United States Patent
Ozaki et al.

(10) Patent No.: US 6,353,033 B1
(45) Date of Patent: Mar. 5, 2002

(54) METHOD AND APPARATUS FOR CUTTING HIGH VISCOSITY LIQUID MATERIAL

(75) Inventors: Koichi Ozaki; Toru Imaizumi; Koichi Ishida; Toyohiko Yamadera; Mitsuo Hamada, all of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/628,468

(22) Filed: Jul. 31, 2000

(30) Foreign Application Priority Data

Jul. 30, 1999 (JP) .......................................... 11-216467

(51) Int. Cl.$^7$ ................................................ B01F 17/00
(52) U.S. Cl. ...................... 516/55; 366/134; 366/160.4; 366/176.3; 426/519; 516/53; 516/924
(58) Field of Search ............................. 516/53, 55, 924; 523/318; 366/134, 160.4, 176.3; 426/519

(56) References Cited

U.S. PATENT DOCUMENTS

| | | | | |
|---|---|---|---|---|
| 2,552,195 A | * | 5/1951 | Lopata | 366/176.3 |
| 3,971,851 A | * | 7/1976 | Otto | 426/519 |
| 4,096,585 A | * | 6/1978 | Fiorentini | 366/134 |
| 4,497,579 A | * | 2/1985 | Schmitz et al. | 366/134 |
| 4,844,620 A | * | 7/1989 | Lissant et al. | 366/160.4 X |
| 5,376,347 A | * | 12/1994 | Ipponmatsu et al. | 516/33 X |

FOREIGN PATENT DOCUMENTS

JP 7-98099 4/1995

\* cited by examiner

Primary Examiner—Richard D. Lovering
(74) Attorney, Agent, or Firm—Jia L. Da Cesare

(57) ABSTRACT

Method and apparatus for cutting high viscosity liquid material, said apparatus comprising a cylinder divided into upper and lower tanks by a partition with a central discharge opening, a moveable and elevatable liquid supply pipe with a distal end positioned opposite the discharge opening, the liquid supply pipe being mounted so that it can be raised until its distal end contacts the partition around the discharge opening, and then lowered until there is no contact, means for raising and lowering the liquid supply pipe, the upper tank having peripheral injection ports for injecting a low viscosity liquid into the upper tank, means for feeding high viscosity liquid material into the lower tank and flowing it into the upper tank, means for feeding low viscosity liquid into the liquid supply pipe and for feeding low viscosity liquid into the peripheral injection ports, the high viscosity liquid material flowing from the lower tank into the upper tank when the liquid supply pipe is lowered, the high viscosity liquid material being pushed upwardly into the upper tank by the low viscosity liquid when the liquid supply pipe is raised, whereby the high viscosity liquid material being pushed upwardly in the upper tank is cut into blocks by the low viscosity liquid being injected into the upper tank.

6 Claims, 1 Drawing Sheet

METHOD AND APPARATUS FOR CUTTING HIGH VISCOSITY LIQUID MATERIAL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention relates to a method and apparatus for cutting high viscosity liquid materials.

BACKGROUND OF THE INVENTION

A method in which a high viscosity liquid material is cut into blocks for easier handling is frequently employed in fields of technology dealing with rubbers, plastics, adhesives, paints, and foods. For instance, in the manufacture of an organic solvent solution of a high viscosity liquid material such as crude silicone rubber or synthetic rubber, the high viscosity liquid material is taken from its manufacturing apparatus or storage site and cut into blocks, and these blocks are then put into an organic solvent and mixed.

In fields of technology dealing with high viscosity liquid materials such as foods, a high viscosity food material whose main ingredient is a starch or protein is taken from its storage site through a supply pipe, cut into blocks, and these blocks are sealed in a container.

A method employed in the past for putting such high viscosity liquid materials into the form of blocks was to cut the material with a mechanical means using a blade or cutting tool similar to a blade. However, when the high viscosity liquid material was a tacky material, the high viscosity liquid material would often adhere to the surface of the cutting tool and decrease its cutting performance. In severe cases it was even impossible to cut the high viscosity liquid material. Also, if a block form of the high viscosity liquid material needed to be discharged in a specific quantity, high viscosity liquid material adhering to the cutting tool had to be scraped off or washed away each time, and this resulted in poor productivity.

Another problem was that the quality of the high viscosity liquid material itself was diminished when a high viscosity liquid material such as an adhesive agent was exposed to the outside air and its properties modified.

A number of methods have been proposed for solving such problems. For example, in Japanese Application H7-98099, there is a method in which a pressurized gas composed of nitrogen or other inert gas is blown into a high viscosity liquid material in the pipe through which the material passes, thereby cutting the high viscosity liquid material, and discharging it in the form of blocks. With this method, however, the pressurized gas used for cutting often expands suddenly within the high viscosity liquid material, that it splattered or scattered the high viscosity liquid material.

BRIEF SUMMARY OF THE INVENTION

It is therefore an object of the invention to provide a method for cutting high viscosity liquid materials in which the high viscosity liquid material can be cut into blocks in specified amounts, and with good productivity, and to provide a cutting apparatus which can be used in the cutting method.

These and other features of the invention will become apparent from a consideration of the detailed description.

Figure 1:
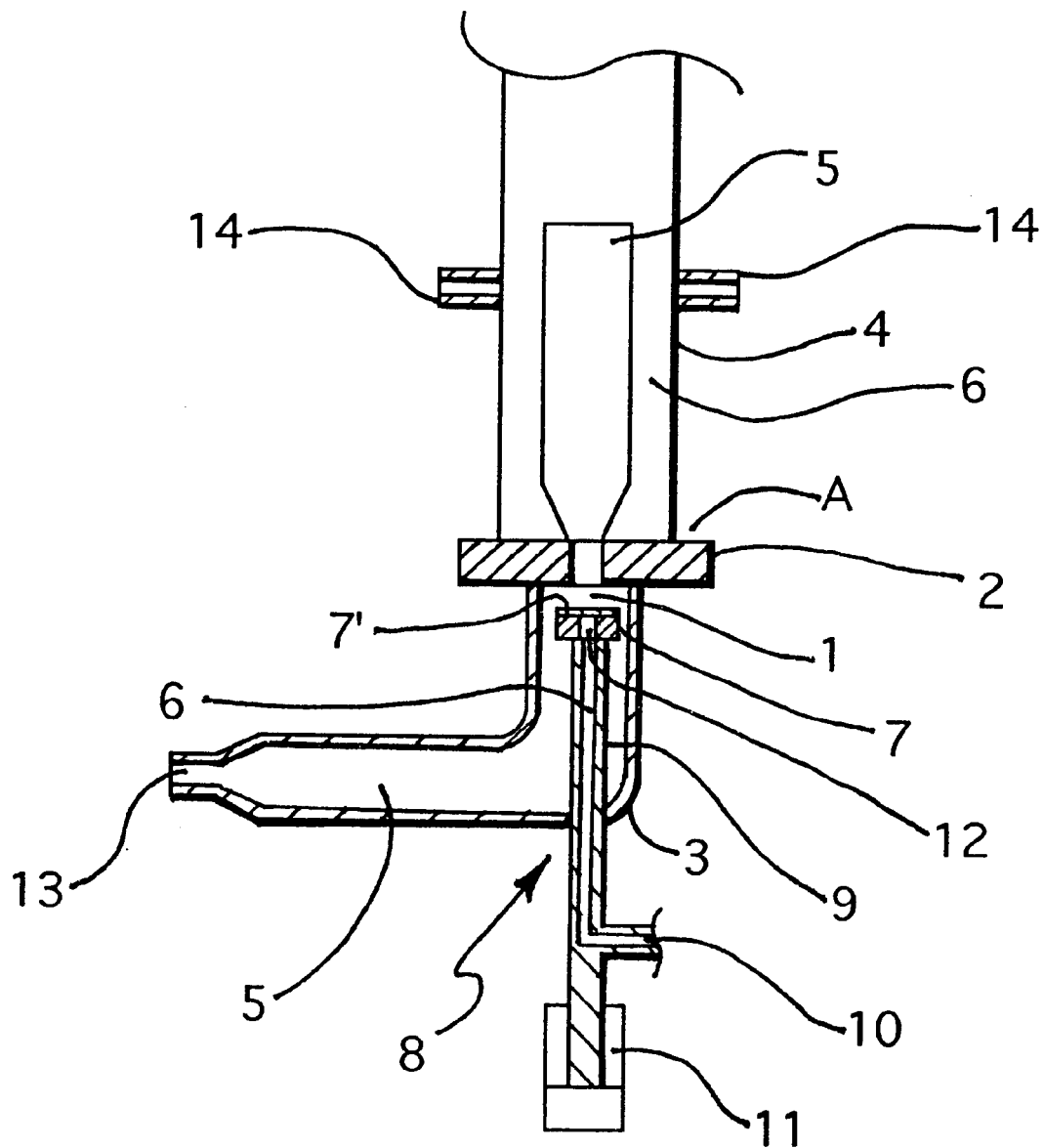
FIG. 1 is a pictorial representation, partly in cross section, and a simplified diagram, illustrating an embodiment of the cutting apparatus of the invention.

In this single FIGURE, 1 is a discharge opening, 2 is a partition, 3 is the cylindrical lower tank, 4 is the cylindrical upper tank, 5 is a high viscosity liquid material, 6 is a low viscosity liquid, 7 represents a distal end, 8 is an elevatable low viscosity liquid supply pipe, 9 is a conduit, 10 is the low viscosity liquid supply port, 11 is a pressure cylinder, 12 is the low viscosity liquid outflow port, 13 is the high viscosity liquid material supply port, 14 is the low viscosity liquid injection port, and the letter "A" is used to generally represent the high viscosity liquid material cutting apparatus of the invention.

DETAILED DESCRIPTION OF THE INVENTION

The method for cutting a high viscosity liquid material of this invention is characterized in that a specific amount of a high viscosity liquid material 5 is discharged from a lower tank 3 of a cylinder which is divided into upper 4 and lower 3 tanks by a partition 2 having a discharge opening 1 near its center, through the discharge opening 1, into a low viscosity liquid 6, the specific gravity of which is greater than the specific gravity of the high viscosity liquid material 5 contained in the upper tank 4. Then a low viscosity liquid supply pipe 8, whose distal end 7 is opposite the discharge opening 1, is raised until the distal end 7 is in contact with the partition 2 around the periphery of the discharge opening 1, and the low viscosity liquid 10 is then made to flow out of the distal end 7, and the discharged high viscosity liquid material 5 is cut into blocks.

There is also provided herein a continuous method for cutting high viscosity liquid materials which is characterized by repeating the following Steps 1 and 2.

In Step 1, a specific amount of a high viscosity liquid material is discharged from the lower tank of a cylinder divided into upper and lower tanks by a partition having a discharge opening near its center, through the discharge opening, into a low viscosity liquid, the specific gravity of which is greater than the specific gravity of the high viscosity liquid material contained in the upper tank, after which a low viscosity liquid supply pipe whose distal end is opposite the discharge opening, is raised until the distal end is in contact with the partition around the periphery of the discharge opening, and the low viscosity liquid is then made to flow out of the distal end, and the discharged high viscosity liquid material is cut into blocks.

In Step 2, the low viscosity liquid supply pipe is lowered.

The apparatus for cutting the high viscosity liquid material according to the invention is characterized by having a cylinder which is divided into upper and lower tanks by a partition having a discharge opening near its center, and an elevatable low viscosity liquid supply pipe within the lower tank of the cylinder whose distal end is opposite the discharge opening.

The high viscosity liquid material should have a high viscosity at normal temperature. For example, the viscosity at 25° C. should be at least 300,000 mPa·s/300,000 centistoke, and preferably should be at least 1,000,000 mPa·s/1,000,000 centistoke. It should have very little fluidity or only be able to flow under pressure. However, it should be a material that can be supplied through a pipe and pumped under pressure.

The term "high viscosity liquid material" is intended to encompass high viscosity liquid materials, high viscosity semi-liquid materials, semi-liquid slurries, and semi-liquid pastes. Examples of such high viscosity liquid materials include high viscosity, i.e., a Williams plasticity of 90–300 at 25° C., diorganopolysiloxanes termed crude silicone rubber; polybutadienes in the form of crude rubber; polyisobutylenes in the form of crude rubber;

Also included are other such high viscosity hydrophobic macromolecular materials; mixtures of hydrophobic macromolecular materials with other components; slurries of macromolecular compounds in the form of crude rubber; high viscosity aliphatic hydrocarbon oils; high viscosity aromatic hydrocarbon oils; asphalt; high viscosity food materials; and foods whose main ingredient is protein, starch, or malt syrup.

A low viscosity liquid is used in the cutting method of the invention, and its function is to separate the high viscosity liquid material from the discharge opening, and completely cut the high viscosity liquid material by bringing the distal end of the low viscosity liquid supply pipe into contact around the periphery of the discharge opening.

While the high viscosity liquid material discharged from the lower tank through the discharge opening and into the upper tank, is cut when the distal end of the low viscosity liquid supply pipe is brought into contact with the partition around the periphery of the discharge opening, the cut high viscosity liquid material may not pull away from the discharge opening completely. However, it will be pulled away from the discharge opening when the low viscosity liquid flows from the low viscosity liquid supply pipe distal end toward the upper tank, and the high viscosity liquid material in block form rises through the low viscosity liquid filling the upper tank.

The low viscosity liquid must have a higher specific gravity than the high viscosity liquid material. It is preferred that the low viscosity liquid be one that is either mutually insoluble with the high viscosity liquid material, or one which will only dissolve slightly. The viscosity should generally be between 1–500 mPa·s at room temperature, with a range of 0.1–100 mPa·s being most preferred.

Some examples of low viscosity liquids include water; aqueous solutions of inorganic salts such as brine; ethanol, acetic acid, ethylene glycol, and other such hydrophilic organic compounds and aqueous solutions thereof; low viscosity diorganopolysiloxanes; organic solvents such as toluene, xylene, and hexane; and edible oils. When the high viscosity liquid material is a hydrophobic macromolecular material such as a crude silicone rubber, it is preferred that the low viscosity liquid be a hydrophilic material such as water.

The time during which the distal end of the low viscosity liquid supply pipe is in contact with the partition around the periphery of the discharge opening is usually 0.05 seconds or less, and preferably 0.03 seconds or less, when the high viscosity liquid material is a crude silicone rubber and the low viscosity liquid is water.

There are no particular limitations on the flow of low viscosity liquid from the distal end of the low viscosity liquid supply pipe. However, the amount should be sufficient such that the block of high viscosity liquid material cut by contact between the distal end and the partition around the periphery of the discharge opening, can be pulled away from the discharge opening, and enable the cut block of high viscosity liquid material to float upwardly through the low viscosity liquid in the upper tank.

When the high viscosity liquid material is a crude silicone rubber and the low viscosity liquid is water, the flow of low viscosity liquid from the distal end is typically between 5–30 kg/hr per 10 $cm^2$ of cross sectional area of the cylindrical vessel. The pressure of the low viscosity liquid flowing from the distal end should be high enough to completely separate the blocks of high viscosity liquid material from the discharge opening. It can be adjusted according to the type and amount of high viscosity liquid material. However, it must be higher than the pressure applied to the high viscosity liquid material in the upper tank. For instance, when the high viscosity liquid material is crude silicone rubber and the low viscosity liquid is water, the pressure of low viscosity liquid from the distal end is preferably between 0.3–1.0 MPa/3–10 atmospheres.

The apparatus for cutting the high viscosity liquid material according to the invention has a cylinder divided into upper and lower tanks by a partition having a discharge opening near its center. There is an elevatable low viscosity liquid supply pipe in the lower tank of the cylinder whose distal end is opposite the discharge opening. The shape of the discharge opening for the high viscosity liquid material should be selected according to the shape and size of high viscosity liquid to be cut into blocks. While it is preferred that the upper and lower tanks be cylindrical, they may have a prismatic shape. The upper tank, lower tank, and partition can be made of a metal such as stainless steel and duralumin, as well as a glass fiber reinforced plastic.

When viewed from the side, the lower tank can be in the shape of a straight cylinder, L-shaped, a shape between these shapes, or it can be a cylinder whose diameter in the middle is larger than its diameter at the ends. The lower tank is equipped with a high viscosity liquid material supply port positioned below the partition, and the port communicates with the high viscosity liquid material supply source. If the lower tank is L-shaped, it is preferred that the high viscosity liquid material supply port be located on the opposite side from the partition. When the upper tank is viewed from the side, it can be shaped as a straight cylinder, a reversed L-shape, or something between these shapes.

Preferably, the diameter of the upper tank should be between 1.5–10 times the diameter of the high viscosity liquid material blocks, more preferably 1.5–3 times the diameter. The upper tank is equipped with a drain opening for the high viscosity liquid material blocks and the low viscosity liquid. The drain opening communicates with an apparatus for recovering the high viscosity liquid material and low viscosity liquid.

The low viscosity liquid supply pipe is elevatable, and can be made of metal. It can be raised and lowered by a pneumatic or hydraulic cylinder. A low viscosity liquid outflow port is provided in the center at the distal end of the low viscosity liquid supply pipe, and a conduit leading to a low viscosity liquid outflow source is provided inside the port.

Preferably, a cushioning member 7' composed of a fluororesin, polyamide resin, polyimide resin, or other organic resin, is connected to the distal end of the low viscosity liquid supply pipe, to soften the impact when the pipe is brought into contact with the periphery of the discharge opening, and to improve its durability. The supply of high viscosity liquid material to the lower tank, and the supply of low viscosity liquid to the low viscosity liquid supply pipe can be provided by a high pressure plunger type pump or a piston type pump. High viscosity liquid material cut into blocks floats in the low viscosity liquid in the upper tank, rises, and is transferred to a recovery apparatus through the drain opening in the upper tank.

The cutting apparatus of the invention is depicted in FIG. 1. Cutting apparatus A consists of cylindrical lower tank 3 and cylindrical upper tank 4, which are divided into upper and lower tanks by a partition 2 having a discharge opening 1 in the center. There can be seen an elevatable low viscosity liquid supply pipe 8 disposed inside the cylindrical lower tank 3. The distal end of supply pipe 8 is opposite discharge opening 1.

Cylindrical lower tank 3 is equipped with a high viscosity liquid material supply port 13. The elevatable low viscosity liquid supply pipe 8 extends outside the cylindrical lower tank 3, and a low viscosity liquid supply port 10 is provided on the outside of the cylindrical lower tank 3. A pressure cylinder 11 is fixed to the lower end of the elevatable low viscosity liquid supply pipe 8, and the supply pipe 8 is raised or lowered via the input from pressure cylinder 11. A low viscosity liquid outflow port is provided at distal end 7. The organic resin member 7' serving as the cushion is joined to the top of distal end 7. A plurality of low viscosity liquid inflow ports 14 are provided at positions facing the side wall of cylindrical upper tank 4.

EXAMPLES

The invention will now be described in further detail through the following working example.

Working Example 1

A crude dimethylpolysiloxane silicone rubber with a Williams plasticity of 130 at 25° C. was used as high viscosity liquid material 5. Water was used as low viscosity liquid 6, and blocks were cut continuously. Apparatus A in FIG. 1 was used for cutting the high viscosity liquid material. The crude silicone rubber was supplied through the high viscosity liquid material supply port 13 into cylindrical lower tank 3 which had an inside diameter of 100 mm. It was supplied at a rate of 500 kg/hour and continuously discharged through discharge opening 1. Opening 1 had an inside diameter of 35 mm. It then flowed into cylindrical upper tank 4 having had an inside diameter of 150 mm and length of 4 m which was filled with water 6.

After discharged crude silicone rubber had moved 45 cm vertically, the low viscosity liquid supply pipe 8 located at the bottom of the cylindrical lower tank 3 was raised at a rate of 1 m/second, and the distal end 7 was held in contact with the partition around the periphery of the discharge opening 1 for 0.05 second. 200 cc of water were then allowed to flow out from the center of the low viscosity liquid outflow port 12 toward the cylindrical upper tank 4 at a pressure of 0.5 mPa for a period of 0.5 second. Water was continuously injected into the cylindrical upper tank 4 at a rate of 400 kg/hour from four low viscosity liquid injection ports 14 having a diameter of 2 mm, which were disposed at 90 degree angles and 30 cm away from discharge opening 1. Then the pneumatic cylinder 11 was actuated to lower the low viscosity liquid supply pipe 8 at a rate of 1 m/second.

By repeating this procedure, crude silicone rubber was continuously cut into blocks with lengths of 45 cm and diameters of 35 mm.

The beneficial effects of this invention reside in the fact that a specific amount of a high viscosity liquid material can be discharged from the lower tank of a cylinder divided into upper and lower tanks by a partition having a discharge opening near its center, through the discharge opening, into a low viscosity liquid, the specific gravity of which is greater than the specific gravity of the high viscosity liquid material contained in the upper tank, after which a low viscosity liquid supply pipe whose distal end is opposite the discharge opening is raised, until the distal end is in contact with the partition around the periphery of the discharge opening, and the low viscosity liquid is then made to flow out of the distal end, and the discharged high viscosity liquid material is cut into blocks.

Therefore, the high viscosity liquid material can be cut into blocks in specified amounts and with good productivity. Also, since the apparatus for cutting the high viscosity liquid material includes a cylinder divided into upper and lower tanks by a partition having a discharge opening near its center, and an elevatable low viscosity liquid supply pipe is provided within the lower tank of the cylinder whose distal end is opposite the discharge opening, the apparatus efficient in cutting high viscosity liquid materials.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of cutting a high viscosity liquid material comprising the steps of discharging a predetermined amount of a high viscosity liquid material from the lower tank of a cylinder, the cylinder being divided into upper and lower tanks by a partition with a central discharge opening, passing the high viscosity liquid material through the discharge opening into a low viscosity liquid contained in the upper tank, the low viscosity liquid having a specific gravity greater than the high viscosity liquid material, raising a liquid supply pipe with a distal end opposite the discharge opening until the distal end contacts the partition around the discharge opening, flowing low viscosity liquid out from the distal end of the liquid supply pipe into the upper tank, while simultaneously injecting another portion of low viscosity liquid peripherally into the upper tank, whereby high viscosity liquid material is moved upwardly into the upper tank by low viscosity liquid from the liquid supply pipe, and the high viscosity liquid material is cut into blocks by low viscosity liquid injected peripherally into the upper tank.

2. The method according to claim 1 in which the liquid supply pipe is alternately raised and lowered so as to carry out the cutting process on a continuous basis.

3. The method according to claim 1 in which the high viscosity liquid material is a hydrophobic macromolecular material, and the low viscosity liquid is a hydrophilic liquid.

4. The method according to claim 3 in which the hydrophobic macromolecular material is raw silicone gum and the hydrophilic liquid is water.

5. Apparatus for cutting a high viscosity liquid material comprising a cylinder divided into upper and lower tanks by a partition with a central discharge opening, a movable and elevatable liquid supply pipe with a distal end positioned opposite the discharge opening, the liquid supply pipe being mounted so that it can be raised until its distal end contacts the partition around the discharge opening, and then lowered until there is no contact, means for raising and lowering the liquid supply pipe, the upper tank having peripheral injection ports for injecting a low viscosity liquid into the upper tank, means for feeding high viscosity liquid material into the lower tank and flowing it into the upper tank, means for feeding low viscosity liquid into the liquid supply pipe and for feeding low viscosity liquid into the peripheral injection ports, the high viscosity liquid material flowing from the lower tank into the upper tank when the liquid supply pipe is lowered, the high viscosity liquid material being pushed upwardly into the upper tank by the low viscosity liquid when the liquid supply pipe is raised, whereby the high viscosity liquid material being pushed upwardly in the upper tank is cut into blocks by the low viscosity liquid being injected into the upper tank.

6. An apparatus according to claim 5 in which the lower tank is bent in an L-shape.

* * * * *